United States Patent [19]

Hirata et al.

[11] Patent Number: 4,803,372
[45] Date of Patent: Feb. 7, 1989

[54] LINE POSITION DETECTING APPARATUS FOR DETECTING A V-SHAPED INDENT

[75] Inventors: Tadashi Hirata, Yamato; Katsumi Koyama, Hiratsuka; Hideaki Takahashi, Atsugi; Yasuhiro Harashima, Atsugi; Michio Kitahara, Atsugi; Katsuyuki Igarashi, Itabashi; Jun Kitamura, Yokohama; Hiroshi Kikuchi; Kimiyuki Narisada, both of Tokyo, all of Japan

[73] Assignee: Amada Company, Limited, Japan

[21] Appl. No.: 37,144

[22] Filed: Apr. 10, 1987

[30] Foreign Application Priority Data

Apr. 11, 1986 [JP] Japan ............................ 61-082369

[51] Int. Cl.$^4$ ............................................. G01B 11/00
[52] U.S. Cl. .................................... 250/561; 250/236; 350/6.9
[58] Field of Search ............... 250/202, 236, 561, 548; 350/6.5, 6.9; 358/285, 289; 356/152

[56] References Cited

U.S. PATENT DOCUMENTS

| | | | |
|---|---|---|---|
| 4,099,051 | 7/1978 | Gugliotta | 250/236 |
| 4,413,180 | 11/1983 | Libby | 250/236 |
| 4,501,950 | 2/1985 | Richardson | 250/202 |
| 4,622,462 | 11/1986 | Eaton et al. | 250/236 |

Primary Examiner—Edward P. Westin
Attorney, Agent, or Firm—Wigman & Cohen

[57] ABSTRACT

To detect a line position described on a surface by a simple structure, the line position detecting apparatus comprises a light beam generator including a laser diode, a collimator, a prism, and a mirror; a motor for rotating a laser beam to describe a circular locus on the surface; an encoder for detecting a laser beam angular position; a photosensor for detecting a laser beam reflected from the surface; and a calculator for detecting an angular position at which light beam intensity changes due to the presence of the line at at least one point of intersection between the line and the circular locus and for calculating the point indicated by x-y coordinates on the basis of the diameter of the circular locus and the detected angular position of a line to be detected.

10 Claims, 5 Drawing Sheets

FIG. IA
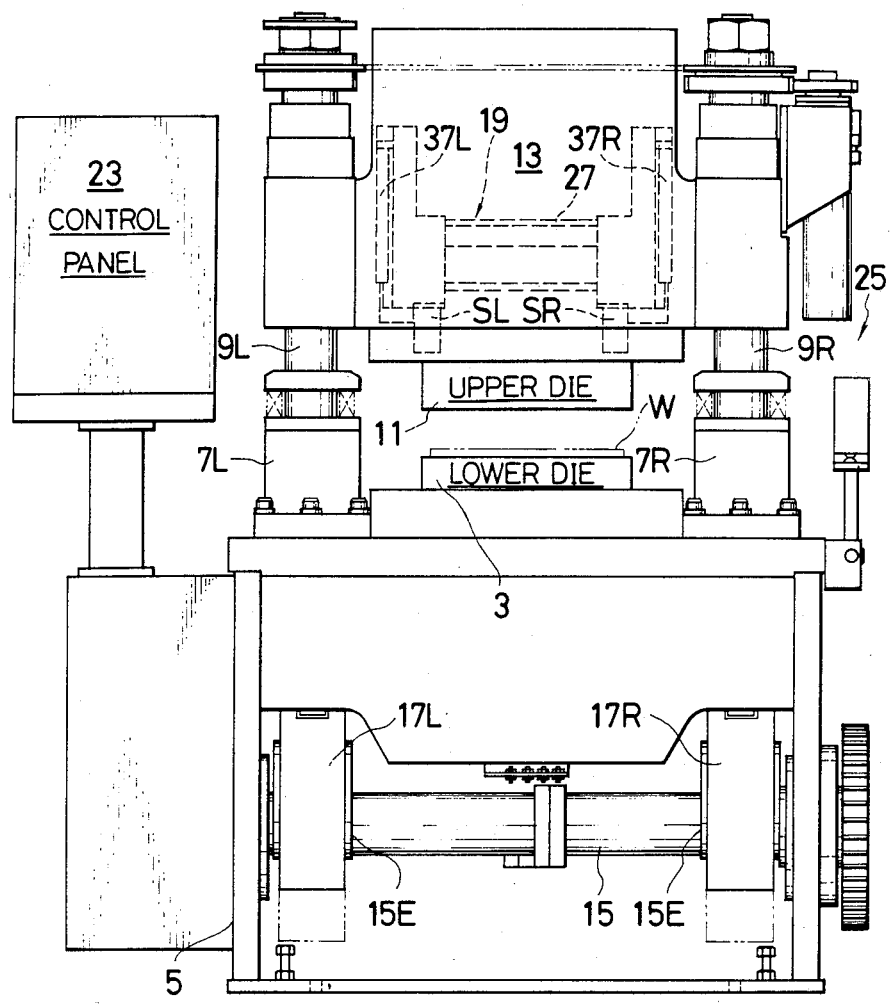

FIG.IC
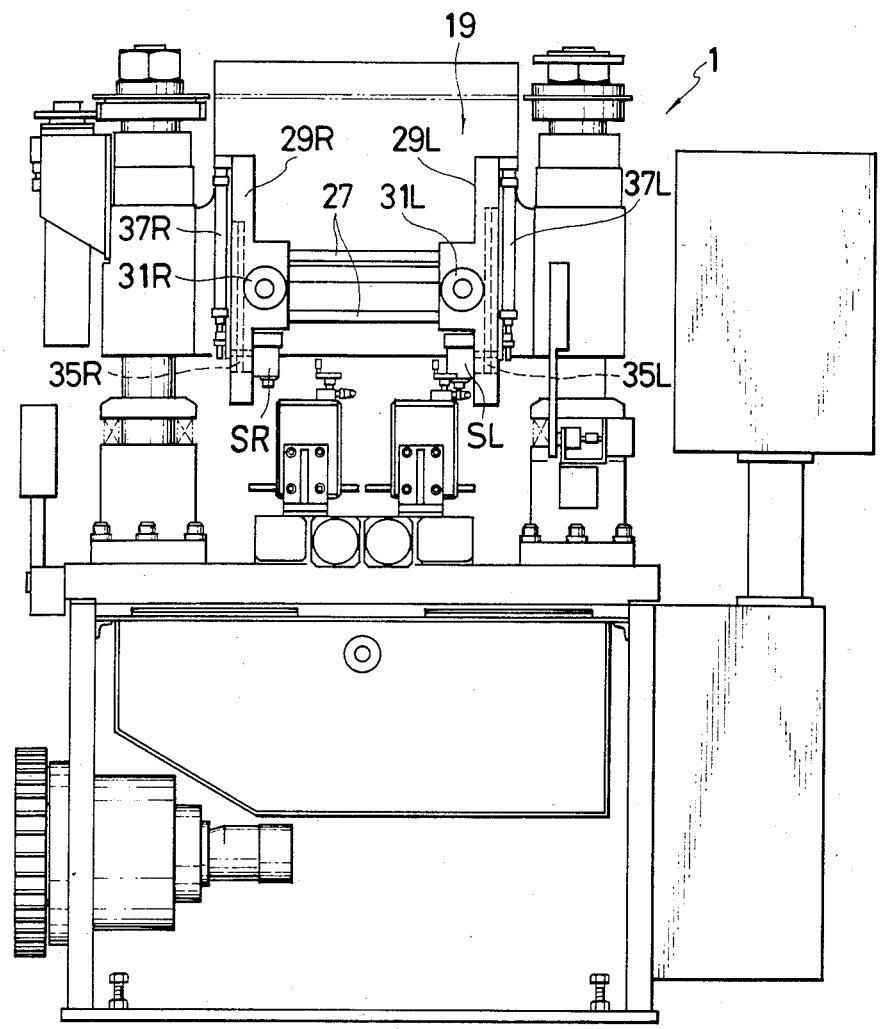

LINE POSITION DETECTING APPARATUS FOR DETECTING A V-SHAPED INDENT

BACKGROUND OF THE INVENTION

1. Field of the Invention

The present invention relates to a line position detecting apparatus, and more specifically to an apparatus for detecting a line position such as a marking-off (scriber) line, a line mark, a material end edge, etc., which is suitably applicable to a machine tool such as a bending machine.

2. Description of the Prior Art

As an apparatus for detecting a line position such as a marking-off line, a line mark, a material end edge, etc., an image processor has so far been used. The image processor can accurately detect a line position; however, there exists a problem in that the image processor is complicated in structure and therefore too expensive to be usable for a machine tool in which a marking-off line should be detected for providing a higher processing precision.

SUMMARY OF THE INVENTION

With these problems in mind, therefore, it is the primary object of the present invention to provide a line position detecting apparatus which can detect a line position precisely in spite of a relatively simple configuration and therefore at a low cost.

To achieve the above-mentioned object, the line position detecting apparatus according to the present invention comprises:

(a) means for irradiating a surface to be measured with a light beam; (b) means for rotating the light beam emitted from said measured surface irradiating means so as to describe a circular locus on the surface with a coordinates origin as its center; (c) means for detecting an angular position of the light beam rotating means from a coordinates axis; (d) means for detecting an intensity of light beam reflected from the surface; and (e) means for detecting an angular position at which the intensity of light beam reflected from the surface changes due to presence of the line at at least one point of intersection between the line and the circular locus and calculating the point indicated by x-y coordinates on the basis of a diameter of the irradiated circular locus and the detected angular position.

The measured surface irradiating means comprises a laser diode, a collimator, a prism, a mirror, etc. The light beam rotating means is a motor. The beam angular position detecting means is an encoder. The light beam intensity detecting mean is a photosensor.

When a line described on the surface measured is formed into a V-shaped notch, the angular position detecting means calculates an average value of two angular positions at which light beam intensity is lowered due to presence of two notch slopes. The x-y coordinates calculating means calculates in line position as $-x = (D/2) \cos\theta$, where D denotes a diameter of the circular locus and $\theta$ denotes an angular position. When two points of intersection between the line and the circular locus are detected, an intermediate point between the two points is calculated as an average position.

Where a pair of the line position detecting apparatus are disposed at an interval substantially in parallel to a line to be detected, it is possible to obtain a line by connecting two points detected by each detecting apparatus.

BRIEF DESCRIPTION OF THE DRAWINGS

The features and advantages of the line position detecting apparatus according to the present invention will be more clearly appreciated from the following description of the preferred embodiment of the invention taken in conjunction with the accompanying drawings in which like reference numerals designate the same or similar elements or sections throughout the figures thereof and in which:

FIG. 1A is a front view of a bending machine to which a line position detecting apparatus according to the present invention is applied;

FIG. 1C is a rear view of the bending machine shown in FIGS. 1A and 1B;

DETAILED DESCRIPTION OF THE PREFERRED EMBODIMENT

Figure 1B:
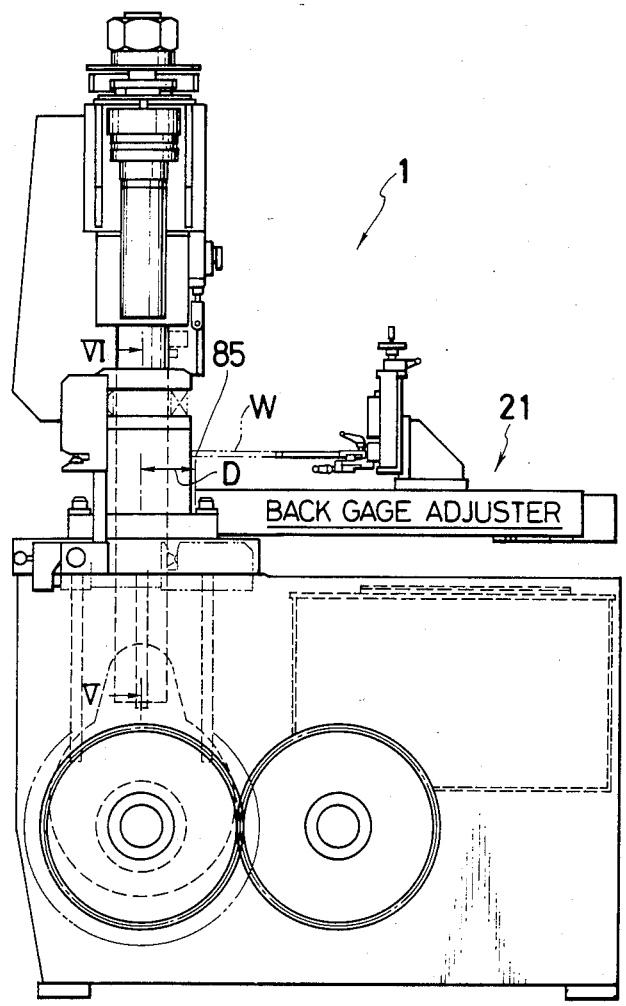
FIG. 1B is a side view of the bending machine shown in FIG. 1A.

With reference to FIGS. 1A, 1B and 1C, a bending machine to which a line position detecting apparatus according to the present invention is applied will be described by way of example.

A bending machine 1 for bending a sheet-like workpiece W is provided with a box-shaped machine base 5 on which a lower die 3 is mounted. A pair of right and left guide members 7R and 7L are provided on both the sides of the machine base 5. Two guide posts 9R and 9L are vertically supported by the guide members 7R and 7L so as to be slidable up and down. An upper table (ram) 13 for supporting an upper die 11 is supported by the right and left guide posts 9R and 9L on both the sides thereof. The upper die 11 bends a workpiece W in cooperation with the lower die 3. The lower ends of the guide posts 9R and 9L are connected via connecting rods 17R and 17L respectively, to eccentric portions 15E of an eccentric shaft (crankshaft) 15 rotatably supported by the machine base 5.

In the above construction, when the eccentric shaft 15 is rotated, the upper table 13 is moved up and down being guided by the guide posts 9R and 9L. Therefore, when a workpiece W is placed on the lower die 3 and then the eccentric shaft 15 is rotated to lower and upper table 13, the upper die 11 is engaged with the lower die 3, so that the workpiece W is bent.

To bend a workpiece W as described above, a pair of line position detecting apparatus 19 for optically detecting a marking-off line described on the workpiece W are mounted on the rear surface of the upper table 13. Further, the back gage adjuster 21 (back gage implies a relative position of a workpiece to a reference position) is provided at the back side of the lower die 3 (on the right side in FIG. 1B) in order to accurately position the workpiece W in response to a detection signal from the line position detecting apparatus 19. In addition, the bending machine 1 is provided with a control panel 23 and a thickness sensor 25 for detecting a thickness of the workpiece W to be bent and outputting a detected data to the control panel 23.

The line position detecting apparatus 19 is provided with two support members 29R and 29L (shown in FIG. 1C) so as to be adjustable in the right and left direction along two guide rails 27 arranged horizontally on the rear surface of the upper table 13. A fixing bolt having a fastening knob 31R or 31L is attached to each support member 29R or 29L to fixed each support member to the guide rails 27. Two elevator members 35R and 35L are provided for the support members 29R and 29L, respectively; and two elevator cylinders 37R and 37L are disposed for moving the elevator members 35R and 35L up and down. Two sensors SR and SL are mounted on the elevator members 35R and 35L, respectively, as shown in FIG. 2.

Therefore, the two detecting apparatus 19 are movable to and fro along the two guide rails 27 and up and down together with the elevator members 35R and 35L by the elevator cylinders 37R and 37L. When the cylinders 37R and 37L are both operated, the two sensors S (SR and SL) are brought to near the surface of the workpiece W.

Figure 2:
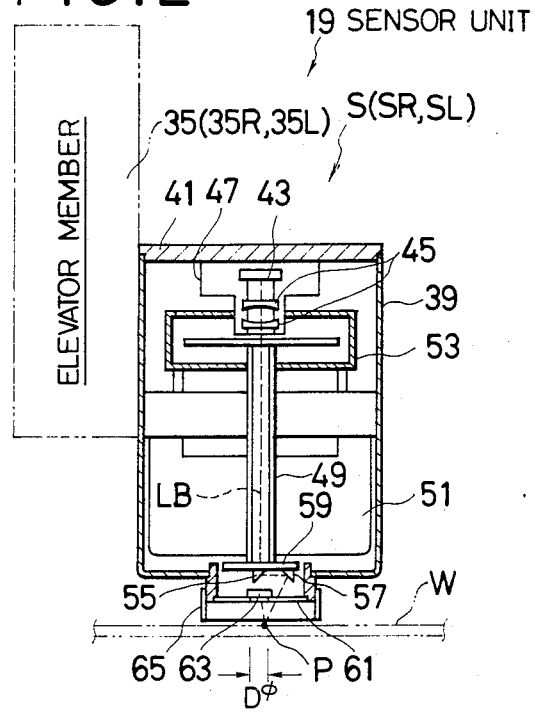
FIG. 2 is a cross-sectional view, partially side view, showing a sensor unit of the line position detecting apparatus according to the present invention.

In FIG. 2, each sensor S has a cylindrical casing 39 and an upper lid 41 for covering the casing 39. To the inner side of the upper lid 41, a collimation holder 47 is attached to house a laser emitting diode 43 and two collimator lenses 45 for focusing a laser beam emitted from the laser emitting diode 43 at a position along the optical axis thereof to provide a measurement beam.

Figure 4A:
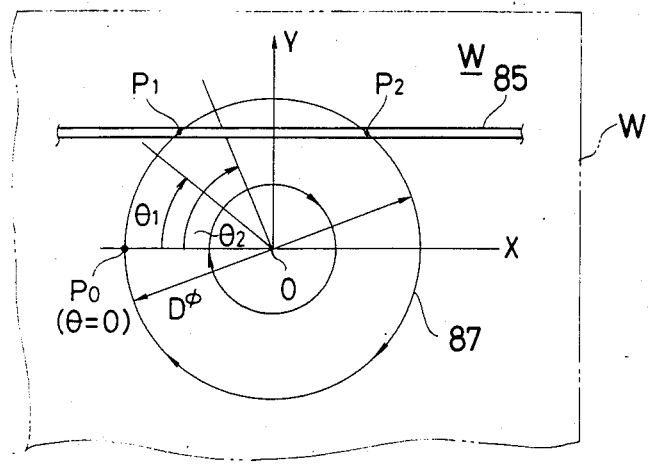
FIG. 4A is an illustration showing a line to be detected and a locus described by the line position detecting apparatus.

At the center of the casing 39, a hollow rotating shaft 49 is provided so as to be rotated by a motor 51 around the optical axis thereof. At the upper end of the rotating shaft 49, an encoder 53 is provided to measure a current angular position of the rotating shaft 49 rotated by the motor 51 in dependence upon a pulse signal indicative of an angular position. At the lower end of the hollow rotating shaft 49, there is attached a rotatable plate 59 having a prism 55 disposed just under the hollow portion of an optical axis of the shaft 49 to bend a beam LB coming through the hollow shaft 49 to a direction perpendicular to the optical axis of the shaft 49 and a mirror 57 for irradiating the workpiece W with the beam LB bent through the prism 55 at a predetermined position P. When the rotating shaft 49 is rotated, this position P describes a circular locus with a predetermined diameter D (e.g. 10 mm) on the workpiece W, as shown in FIG. 4A.

On the other hand, a transparent glass plate 61 is fixedly provided at the bottom of the casing 39; and a photosensor 63 is mounted on the central upper surface of the plate 61 to detect the intensity of the laser beam LB reflected from the workpiece W at the position P in the form of voltage. The diameter of the photosensor 63 is determined sufficiently small as compared with that D of the locus. Further, the transparent plate 61 is supported by the casing 39 via an elastic light shielding cover 65.

Figure 3:
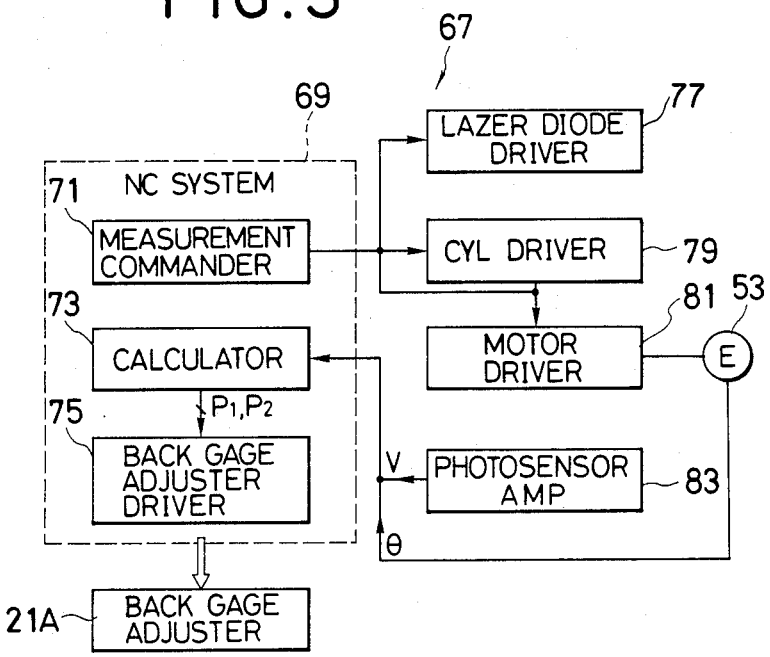
FIG. 3 is a schematic block diagram showing a measurement circuit of the line position detecting apparatus according to the present invention.

FIG. 3 shows a block diagram of the measurement circuit 67 of the line position detecting apparatus, which utilizes a part of an NC system 69 incorporated in the bending machine (as a measurement commander 71, a calculator 73, and a back gage adjuster driver 75. The measurement circuit 67 is composed of a laser diode driver 77, a cylinder driver 79, a motor driver 81, a photosensor amplifier 83, and the encoder 53 in addition to a part (71, 73, 75) of the NC system 69. A detected position signals $P_1$ and $P_2$ are applied to the back gage adjuster driver 75 to drive the back gage adjuster 21.

The measurement commander 71 outputs a command to the laser diode driver 77, the cylinder driver 79 and the motor driver 81, respectively, when processing procedure reaches a time point at which a marking-off line is to be detected.

In response to this command, the laser diode driver 77 supplies a predetermined voltage to the laser diode 43 to generate a laser light therefrom.

In response to the command, the cylinder driver 79 operates the cylinders 37 (37R and 37L) to bring the lower ends of the sensors S (SR and SL) near the upper surface of the workpiece W.

In response to the command, the motor driver 81 activates the motor 51. The motor 51 is driven after the cylinders 37 have been driven and the sensor 5 comes down near the workpiece W. Further, the motor 51 is rotated one revolution in response to the command, so that the rotation plate 59 of the sensor S is also rotated just one revolution.

The calculator 73 checks an angular position at which the intensity of light beam reflected from the surface changes due to presence of a line and calculates a line position in response to a pulse signal indicative of an angle $\theta$ supplied from the encoder 53 and a detection signal V supplied from the photosensor 83, as described later in further detail.

The back gage adjuster driver 75 generates a back gage signal (a correction signal) on the basis of the detected value of the marking-off line, and outputs it to a back gage adjuster 21 for correcting the back gage of the workpiece W.

The operations of the sheet bender and the line position detecting apparatus will be described hereinbelow.

As shown in FIG. 4A, a marking-off line 85 is formed on the workpiece W in order to accurately determine a bending position. The line 85 is formed by a marking-off line processing means such as a machine (turret punch press) or manually. A marking-off line 85 can be described at a bending position or a position a distance D away from a bending position as shown in FIG. 1B. This distance D is determined under consideration of the positions of the dies 3 and 11 and the line position detecting apparatus 19.

When the back gage adjuster 21 (shown in FIG. 1B) is operated, the front end of the back gage adjuster is brought into contact with the rear end of the workpiece W to bring the marking-off line 85 to just below the sensor S.

The operator adjusts the interval between the two sensors SR and SL by using knobs 31R and 31L, and pushes switches on the control board 23 to operate the line position detecting apparatus 19.

The operation of the detecting apparatus 19 will be described in further detail hereinbelow.

The cylinders 37R and 37L shown in FIG. 1C operate to lower the bottom end of the cover 65 of each sensor to a position a little (about 0.5 to 1 mm) over the workpiece W. The cover 65 is made of a soft material such as rubber so as not to be damaged by the workpiece W when being brought into contact with the workpiece W due to the presence of warp of the workpiece W.

Subsequently, the laser diode 43 of the sensor S begins to emit a laser beam and the motor 51 rotates the shaft 49, so that the workpiece W is irradiated with a laser beam LB to describe a circular locus 87 with a diameter D.

Assumption is made that the optical axis of the sensor SR is located at an origin 0 of x-y coordinates and the rotation plate 59 rotates one revolution clockwise beginning from a position $P_0$ ($\theta=0$) in FIG. 4A.

Figure 4B:
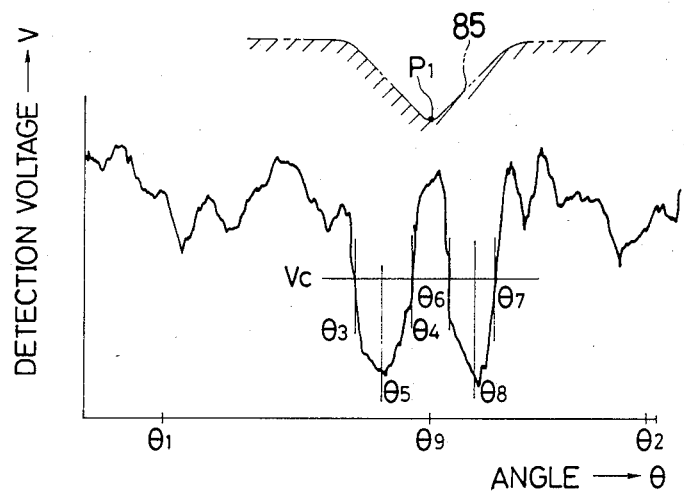
FIG. 4B is a graphical representation showing the relationship between the sensor voltage and the angular position (angle) of the locus described by the line position detecting apparatus.

The photosensor 63 detects the intensity of light reflected from the locus 87 according to the rotation angle $\theta$. As shown in FIG. 4B, the detection signal V is such that there exist two deep valleys before and behind a point of intersection $P_1$ between the circular locus 87 and the marking-off line 85. This valley in voltage is formed because the reflected light is weakened on the slope surface of the V shaped marking-off line 85 in cross section. Here, points of intersection between the detection voltage V and a comparative voltage Vc (determined as an intermediate position of the valley) are designated as $\theta_3$, $\theta_4$ and, $\theta_6$, $\theta_7$. Each of intermediate points between $\theta_3$ and $\theta_4$ is designated as $\theta_5$; that between $\theta_6$ and $\theta_7$ is designated as $\theta_8$; and that between $\theta_5$ and $\theta_8$ is designated as $\theta_9$.

On the basis of the relationship shown in FIGS. 4A and 4B, the calculator 73 calculates one point of intersection $P_1$ ($x_1$, $y_1$) as $$x_1 = -(D/2) \cdot \cos \theta_9 \quad \ldots (1)$$

$$y_1 = (D/2) \cdot \sin \theta_9 \quad \ldots (2)$$

The other point of intersection $P_2$ ($x_2$, $y_2$) can be obtained in the same way.

The calculator 73 determines a position of the marking-off line 85 by calculating an intermediate point of ($P_1+P_2$)/2 between the two points $P_1$ and $P_2$. In the same way, the other sensor SL calculates a position of the marking-off line 85.

As described above, a position of the marking-off line 85 is detected by the two sensors SR and SL, respectively, and the back gage adjuster driver 75 generates an offset signal $\Delta$ D indicative of a correction to the back gage adjuster 21. The back gage adjuster 21 adjusts the back gage, that is, to correct $\Delta$ D so that the marking-off line 85 comes just below the sensor S.

The operator operates a foot pedal device (not shown) to lower the upper die 11, that is, to bend the workpiece W, after having operated the back gage adjuster 21 so that the back gage adjuster end is brought into contact with the workpiece end.

In the line position detecting apparatus 19 as described above, a position of a marking-off line is detected by two sensors disposed at an interval. However, this is an example designed so as to fit a bending machine. It is of course possible to detect a marking-off line 85 by use of a single sensor SR or SL.

Although the above embodiment has been described by taking the case of a marking-off line, any other lines such as line marks, sheet ends, etc. can be detected in the same way.

As described above, according to the present invention, it is possible to provide a line position detecting apparatus of simple structure, which can accurately detect various line positions as marking-off lines, line marks, workpiece edges, etc.

What is claimed is:

1. A line position detecting apparatus for detecting a V-shaped indent described on a surface, which comprises:
    (a) means for irradiating the surface to be measured with a light beam;
    (b) means for rotating the light beam emitted from said measured surface irradiating means so as to describe a circular locus on the surface with a coordinates origin as its center;
    (c) means for detecting an angular position of the light beam rotating means from a coordinates axis;
    (d) means for detecting an intensity of light beam reflected from the V-shaped indent in the form of voltage; and
    (e) means for detecting an angular position of at least one point of intersection between the V-shaped indent and the circular locus on the basis of change in voltage level of the detected signal indicative of the intensity of the reflected light beam and calculating the intersection point indicated by x-y coordinates on the basis of a diameter of the irradiated circular locus and the detected angular position;
    wherein said angular position detecting means compares the detected voltage level indicative of the reflected light beam intensity with a reference voltage level Vc to obtain four intersections $\theta_3$, $\theta_4$, $\theta_6$ and $\theta_7$; and said intersection point calculating means calculates two intermediate angular positions $\theta_5 = (\theta_3+\theta_4)/2$ and $\theta_8 = (\theta_6+\theta_7)/2$, a V-shaped angular position $\theta_9 = (\theta_5+\theta_8)/2$, a V-shaped indent position as $-x = (D/2) \cos \theta_9$ $y = (D/2) \sin \theta_9$ where D denotes a diameter of the irradiated circular locus.

2. The line position detecting apparatus as set forth in claim 1, wherein said measured surface irradiating means comprises:
    (a) a laser diode for emitting a laser beam;
    (b) a collimator for guiding the laser beam into a parallel beam along an optical axis thereof;
    (c) a prism for bending a collimated laser beam at an angle perpendicular to the optical axis; and
    (d) a mirror for reflecting the bent laser beam to the surface to be measured.

3. The line position detecting apparatus as set forth in claim 1, wherein said light beam rotating means is a motor.

4. The line position detecting apparatus as set forth in claim 1, wherein said angular position detecting means is an encoder for generating a pulse signal indicative of an angular position relative to the coordinates axis.

5. The line position detecting apparatus as set forth in claim 1, wherein said light beam intensity detecting means is a photosensor.

6. The line position detecting apparatus as set forth in claim 1, wherein when two points of intersection between the V-shaped indent and the circular locus are detected, said calculating means calculates an intermediate point between two points $P_1$ and $P_2$ as $P=(P_1+P_2)/2$.

7. The line position detecting apparatus as set forth in claim 1, wherein a pair of said line position detecting apparatuses are disposed at an interval substantially in parallel to a line to be detected to obtain a line by connecting two calculated V-shaped indent positions.

8. The line position detecting apparatus as set forth in claim 7, wherein the line to be detected is a marking-off line described on a sheet material.

9. The line position detecting apparatus as set forth in claim 7, wherein the line to be detected is a line mark described on a sheet material.

10. The line position detecting apparatus as set forth in claim 7, wherein the line to be detected is a material end edge.

* * * * *